US009559425B2

(12) United States Patent
Zhu et al.

(10) Patent No.: US 9,559,425 B2
(45) Date of Patent: Jan. 31, 2017

(54) ELECTRONIC DEVICE WITH SLOT ANTENNA AND PROXIMITY SENSOR

(71) Applicant: Apple Inc., Cupertino, CA (US)

(72) Inventors: Jiang Zhu, Sunnyvale, CA (US); Rodney A. Gomez Angulo, Sunnyvale, CA (US); Qingxiang Li, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 14/221,133

(22) Filed: Mar. 20, 2014

(65) Prior Publication Data

US 2015/0270619 A1    Sep. 24, 2015

(51) Int. Cl.
| | |
|---|---|
| *H01Q 13/10* | (2006.01) |
| *G01V 3/00* | (2006.01) |
| *H01Q 1/22* | (2006.01) |
| *H01Q 1/24* | (2006.01) |
| *G06F 1/16* | (2006.01) |

(52) U.S. Cl.
CPC ............... *H01Q 13/10* (2013.01); *G01V 3/00* (2013.01); *G06F 1/1613* (2013.01); *H01Q 1/2266* (2013.01); *H01Q 1/243* (2013.01)

(58) Field of Classification Search
CPC .......... H01Q 1/24; H01Q 1/241; H01Q 1/242; H01Q 1/243; H01Q 5/30; H01Q 5/307; H01Q 5/314; H01Q 5/328
USPC ......... 343/700 MS, 702, 725, 729, 767, 789; 455/41.1, 41.2
See application file for complete search history.

(56) References Cited

U.S. PATENT DOCUMENTS

| 4,016,490 A | 4/1977 | Weckenmann et al. |
| 4,614,937 A | 9/1986 | Poujois |
| 5,337,353 A * | 8/1994 | Boie .................... G01D 5/2405 324/660 |

(Continued)

FOREIGN PATENT DOCUMENTS

| CN | 1343380 | 4/2002 |
| CN | 1543010 | 11/2004 |

(Continued)

OTHER PUBLICATIONS

Yarga et al., U.S. Appl. No. 13/790,549, filed Mar. 8, 2013.

(Continued)

*Primary Examiner* — Dameon E Levi
*Assistant Examiner* — Ab Salam Alkassim, Jr.
(74) *Attorney, Agent, or Firm* — Treyz Law Group, P.C.; G. Victor Treyz; Michael H. Lyons

(57) ABSTRACT

An electronic device may be provided with slot antennas. A slot antenna may be formed from metal structures that have a dielectric gap defining an antenna slot. The metal structures may include multiple metal layers that overlap a plastic antenna window and that serve as capacitive electrodes in a capacitive proximity sensor. The metal structures may also include a metal electronic device housing. The metal electronic device housing and the metal layers may be formed on opposing sides of the antenna slot. The metal layers may have a notch that locally widens the antenna slot at an open end of the antenna slot. One of the metal layers may be shorted to the metal electronic device housing at an opposing closed end of the antenna slot. The antenna slot may be indirectly fed using a near-field-coupled antenna feed structure such as a metal patch that overlaps the antenna slot.

26 Claims, 17 Drawing Sheets

(56) References Cited

U.S. PATENT DOCUMENTS

| | | |
|---|---|---|
| 5,410,497 A | 4/1995 | Viletto |
| 5,463,406 A | 10/1995 | Vannatta et al. |
| 5,650,597 A | 7/1997 | Redmayne |
| 5,826,458 A | 10/1998 | Little |
| 5,854,972 A | 12/1998 | Pennock et al. |
| 5,864,316 A | 1/1999 | Bradley et al. |
| 5,905,467 A | 5/1999 | Narayanaswamy et al. |
| 5,956,626 A | 9/1999 | Kashke et al. |
| 6,181,281 B1 | 1/2001 | Desclos |
| 6,301,489 B1 | 10/2001 | Winstead et al. |
| 6,329,958 B1 | 12/2001 | McLean et al. |
| 6,380,899 B1 | 4/2002 | Madsen et al. |
| 6,408,193 B1 | 6/2002 | Katagishi et al. |
| 6,456,856 B1 | 9/2002 | Werling et al. |
| 6,480,162 B2* | 11/2002 | Sabet ............... H01Q 1/36 |
| | | 343/767 |
| 6,529,088 B2 | 3/2003 | Lafleur et al. |
| 6,590,539 B2 | 7/2003 | Shinichi |
| 6,611,227 B1 | 8/2003 | Nebiyeloul-Kifle et al. |
| 6,657,595 B1 | 12/2003 | Phillips et al. |
| 6,678,532 B1 | 1/2004 | Mizoguchi |
| 6,741,214 B1 | 5/2004 | Kadambi et al. |
| 6,788,266 B2 | 9/2004 | St. Hillaire |
| 6,879,293 B2 | 4/2005 | Sato |
| 6,975,276 B2* | 12/2005 | Brown ............... H01Q 3/46 |
| | | 343/767 |
| 6,978,121 B1 | 12/2005 | Lane et al. |
| 6,985,108 B2 | 1/2006 | Mikkola |
| 6,985,113 B2 | 1/2006 | Nishimura et al. |
| 7,016,686 B2 | 3/2006 | Spaling |
| 7,039,435 B2 | 5/2006 | McDowell et al. |
| 7,050,010 B2 | 5/2006 | Wang et al. |
| 7,109,945 B2 | 9/2006 | Mori |
| 7,113,087 B1 | 9/2006 | Casebolt |
| 7,146,139 B2 | 12/2006 | Nevermann |
| 7,221,092 B2 | 5/2007 | Anzai et al. |
| 7,356,361 B1 | 4/2008 | Hawkins et al. |
| 7,388,550 B2 | 6/2008 | McLean |
| 7,499,722 B2 | 3/2009 | McDowell et al. |
| 7,502,221 B2 | 3/2009 | Fuller et al. |
| 7,522,846 B1 | 4/2009 | Lewis et al. |
| 7,538,760 B2 | 5/2009 | Hotelling et al. |
| 7,551,142 B1 | 6/2009 | Zhang et al. |
| 7,557,760 B2 | 7/2009 | Chang et al. |
| 7,595,788 B2 | 9/2009 | Son |
| 7,633,076 B2 | 12/2009 | Huppi et al. |
| 7,663,612 B2 | 2/2010 | Bladt |
| 7,705,787 B2 | 4/2010 | Ponce De Leon |
| 7,826,875 B2 | 11/2010 | Karaoguz et al. |
| 7,834,813 B2 | 11/2010 | Caimi et al. |
| 7,864,123 B2 | 1/2011 | Hill et al. |
| 7,876,274 B2 | 1/2011 | Hobson et al. |
| 7,999,748 B2 | 8/2011 | Lightenberg et al. |
| 8,059,039 B2 | 11/2011 | Ayala Vazquez et al. |
| 8,059,040 B2 | 11/2011 | Ayala Vazquez et al. |
| 8,115,753 B2 | 2/2012 | Newton |
| 8,159,399 B2 | 4/2012 | Dorsey et al. |
| 8,228,198 B2 | 7/2012 | McAllister |
| 8,238,971 B2 | 8/2012 | Terlizzi |
| 8,255,009 B2 | 8/2012 | Sorensen et al. |
| 8,270,914 B2 | 9/2012 | Pascolini et al. |
| 8,319,692 B2 | 11/2012 | Chiang et al. |
| 8,325,094 B2 | 12/2012 | Ayala Vazquez et al. |
| 8,326,221 B2 | 12/2012 | Dorsey et al. |
| 8,347,014 B2 | 1/2013 | Schubert et al. |
| 8,368,602 B2 | 2/2013 | Hill |
| 8,417,296 B2 | 4/2013 | Caballero et al. |
| 8,432,322 B2 | 4/2013 | Amm et al. |
| 8,436,816 B2 | 5/2013 | Leung et al. |
| 8,466,839 B2 | 6/2013 | Schlub et al. |
| 8,497,806 B2 | 7/2013 | Lai |
| 8,517,383 B2 | 8/2013 | Wallace et al. |
| 8,525,734 B2 | 9/2013 | Krogerus |
| 8,531,337 B2 | 9/2013 | Soler Castany et al. |
| 8,577,289 B2 | 11/2013 | Schlub et al. |
| 8,610,629 B2 | 12/2013 | Pascolini et al. |
| 8,638,266 B2* | 1/2014 | Liu ............... H01Q 9/0421 |
| | | 343/767 |
| 8,638,549 B2 | 1/2014 | Garelli et al. |
| 8,648,752 B2 | 2/2014 | Ramachandran et al. |
| 8,749,523 B2 | 6/2014 | Pance et al. |
| 8,781,420 B2 | 7/2014 | Schlub et al. |
| 8,798,554 B2 | 8/2014 | Darnell et al. |
| 8,836,587 B2 | 9/2014 | Darnell et al. |
| 8,872,706 B2 | 10/2014 | Caballero et al. |
| 8,896,488 B2 | 11/2014 | Ayala Vazquez et al. |
| 8,947,302 B2 | 2/2015 | Caballero et al. |
| 8,947,305 B2 | 2/2015 | Amm et al. |
| 8,952,860 B2 | 2/2015 | Li et al. |
| 8,963,782 B2 | 2/2015 | Ayala Vazquez et al. |
| 8,963,784 B2 | 2/2015 | Zhu et al. |
| 9,024,823 B2 | 5/2015 | Bevelacqua |
| 9,153,874 B2 | 10/2015 | Ouyang et al. |
| 9,337,537 B2 | 5/2016 | Hu et al. |
| 2002/0015024 A1 | 2/2002 | Westerman et al. |
| 2002/0027474 A1 | 3/2002 | Bonds |
| 2002/0060645 A1 | 5/2002 | Shinichi |
| 2002/0094789 A1 | 7/2002 | Harano |
| 2002/0123309 A1 | 9/2002 | Collier et al. |
| 2003/0062907 A1 | 4/2003 | Nevermann |
| 2003/0186728 A1 | 10/2003 | Manjo |
| 2003/0193438 A1 | 10/2003 | Yoon |
| 2003/0197597 A1 | 10/2003 | Bahl et al. |
| 2003/0210203 A1 | 11/2003 | Phillips et al. |
| 2003/0218993 A1 | 11/2003 | Moon et al. |
| 2004/0051670 A1 | 3/2004 | Sato |
| 2004/0080457 A1 | 4/2004 | Guo et al. |
| 2004/0104853 A1* | 6/2004 | Chen ............... G06F 1/1616 |
| | | 343/702 |
| 2004/0176083 A1 | 9/2004 | Shiao et al. |
| 2004/0189542 A1 | 9/2004 | Mori |
| 2004/0222926 A1 | 11/2004 | Kontogeorgakis et al. |
| 2004/0239575 A1* | 12/2004 | Shoji ............... H01Q 1/243 |
| | | 343/770 |
| 2005/0146475 A1 | 7/2005 | Bettner et al. |
| 2005/0168384 A1 | 8/2005 | Wang et al. |
| 2005/0245204 A1 | 11/2005 | Vance |
| 2005/0264466 A1 | 12/2005 | Hibino et al. |
| 2006/0001576 A1 | 1/2006 | Contopanagos |
| 2006/0152497 A1 | 7/2006 | Rekimoto |
| 2006/0161871 A1 | 7/2006 | Hotelling et al. |
| 2006/0232468 A1 | 10/2006 | Parker et al. |
| 2006/0244663 A1 | 11/2006 | Fleck et al. |
| 2006/0248363 A1 | 11/2006 | Chen et al. |
| 2006/0274493 A1 | 12/2006 | Richardson et al. |
| 2006/0278444 A1 | 12/2006 | Binstead |
| 2007/0120740 A1 | 5/2007 | Iellici et al. |
| 2007/0126711 A1 | 6/2007 | Oshita |
| 2007/0188375 A1 | 8/2007 | Richards et al. |
| 2007/0239921 A1 | 10/2007 | Toorains et al. |
| 2008/0165063 A1 | 7/2008 | Schlub et al. |
| 2008/0246735 A1 | 10/2008 | Reynolds et al. |
| 2008/0248837 A1 | 10/2008 | Kunkel |
| 2008/0297487 A1 | 12/2008 | Hotelling et al. |
| 2008/0309836 A1 | 12/2008 | Sakama et al. |
| 2008/0316120 A1 | 12/2008 | Hirota et al. |
| 2009/0000023 A1 | 1/2009 | Wegelin et al. |
| 2009/0096683 A1 | 4/2009 | Rosenblatt et al. |
| 2009/0128435 A1 | 5/2009 | Jeng |
| 2009/0153407 A1 | 6/2009 | Zhang et al. |
| 2009/0153410 A1 | 6/2009 | Chiang |
| 2009/0174611 A1 | 7/2009 | Schlub et al. |
| 2009/0256757 A1 | 10/2009 | Chiang |
| 2009/0256758 A1 | 10/2009 | Schlub et al. |
| 2009/0295648 A1 | 12/2009 | Dorsey et al. |
| 2010/0062728 A1 | 3/2010 | Black et al. |
| 2010/0079351 A1 | 4/2010 | Huang et al. |
| 2010/0081374 A1 | 4/2010 | Moosavi |
| 2010/0109971 A2 | 5/2010 | Gummalla et al. |
| 2010/0167672 A1 | 7/2010 | Ahn et al. |
| 2010/0182203 A1* | 7/2010 | See ............... H01Q 1/2291 |
| | | 343/700 MS |
| 2010/0238072 A1 | 9/2010 | Ayatollahi et al. |
| 2010/0253651 A1 | 10/2010 | Day |

(56) References Cited

U.S. PATENT DOCUMENTS

| | | |
|---|---|---|
| 2011/0012793 A1* | 1/2011 | Amm ................ H01Q 1/243 343/702 |
| 2011/0012794 A1* | 1/2011 | Schlub ............. H01Q 1/243 343/702 |
| 2011/0045789 A1 | 2/2011 | Sinton et al. |
| 2011/0050509 A1 | 3/2011 | Ayala Vazquez et al. |
| 2011/0212746 A1 | 9/2011 | Sarkar et al. |
| 2011/0241949 A1 | 10/2011 | Nickel et al. |
| 2011/0260924 A1 | 10/2011 | Roy |
| 2011/0260939 A1 | 10/2011 | Korva et al. |
| 2011/0300907 A1* | 12/2011 | Hill ................ H01Q 9/285 455/566 |
| 2012/0009983 A1 | 1/2012 | Mow et al. |
| 2012/0068893 A1 | 3/2012 | Guterman et al. |
| 2012/0092298 A1 | 4/2012 | Koottungal |
| 2012/0112969 A1 | 5/2012 | Caballero et al. |
| 2012/0112970 A1 | 5/2012 | Caballero et al. |
| 2012/0176279 A1 | 7/2012 | Merz et al. |
| 2012/0214412 A1* | 8/2012 | Schlub ............. G01B 7/023 455/41.1 |
| 2012/0223865 A1 | 9/2012 | Li et al. |
| 2012/0223866 A1 | 9/2012 | Ayala Vazquez et al. |
| 2012/0229360 A1 | 9/2012 | Jagielski |
| 2012/0299785 A1 | 11/2012 | Bevelacqua |
| 2013/0050038 A1 | 2/2013 | Eom et al. |
| 2013/0106660 A1 | 5/2013 | Kang |
| 2013/0115884 A1 | 5/2013 | Zhang |
| 2013/0154900 A1 | 6/2013 | Tsai |
| 2013/0169490 A1 | 7/2013 | Pascolini et al. |
| 2013/0201067 A1 | 8/2013 | Hu et al. |
| 2013/0203364 A1 | 8/2013 | Darnell et al. |
| 2013/0234910 A1 | 9/2013 | Oh et al. |
| 2013/0241800 A1 | 9/2013 | Schlub et al. |
| 2013/0257659 A1 | 10/2013 | Darnell et al. |
| 2013/0285857 A1* | 10/2013 | Schultz ............. H01Q 5/0027 343/700 MS |
| 2013/0293425 A1 | 11/2013 | Zhu et al. |
| 2013/0321216 A1 | 12/2013 | Jervis et al. |
| 2013/0328730 A1 | 12/2013 | Guterman et al. |
| 2013/0342411 A1* | 12/2013 | Jung ................ H01Q 1/243 343/767 |
| 2014/0009352 A1 | 1/2014 | Sung et al. |
| 2014/0086441 A1 | 3/2014 | Zhu et al. |
| 2014/0184450 A1* | 7/2014 | Koo ................ H01Q 5/335 343/702 |
| 2014/0266922 A1 | 9/2014 | Jin et al. |
| 2014/0266923 A1 | 9/2014 | Zhou et al. |
| 2014/0266941 A1 | 9/2014 | Ayala Vazquez et al. |
| 2014/0292587 A1 | 10/2014 | Yarga et al. |
| 2014/0292598 A1 | 10/2014 | Bevelacqua et al. |
| 2014/0306857 A1 | 10/2014 | Bevelacqua et al. |
| 2014/0315592 A1 | 10/2014 | Schlub et al. |
| 2014/0328488 A1 | 11/2014 | Caballero et al. |
| 2014/0333495 A1 | 11/2014 | Vazquez et al. |
| 2014/0333496 A1 | 11/2014 | Hu et al. |
| 2014/0340265 A1 | 11/2014 | Ayala Vazquez et al. |
| 2014/0375509 A1* | 12/2014 | Vance ............. H01Q 21/30 343/702 |
| 2015/0180123 A1 | 6/2015 | Tatomirescu |
| 2015/0236426 A1 | 8/2015 | Zhu et al. |
| 2015/0255851 A1 | 9/2015 | Guterman et al. |
| 2015/0257158 A1 | 9/2015 | Jadhav et al. |
| 2015/0270618 A1 | 9/2015 | Zhu et al. |
| 2015/0311594 A1 | 10/2015 | Zhu et al. |

FOREIGN PATENT DOCUMENTS

| | | |
|---|---|---|
| CN | 101330162 | 12/2008 |
| DE | 102005035935 | 2/2007 |
| EP | 0086135 | 8/1983 |
| EP | 0 564 164 | 10/1993 |
| EP | 1298809 | 4/2003 |
| EP | 1324425 | 7/2003 |
| EP | 1361623 | 11/2003 |
| EP | 1 469 550 | 10/2004 |
| EP | 1 524 774 | 4/2005 |
| EP | 1564896 | 8/2005 |
| EP | 1593988 | 11/2005 |
| GB | 2 380 359 | 4/2003 |
| JP | 05-128828 | 5/1993 |
| JP | 2003179670 | 6/2003 |
| JP | 2003209483 | 7/2003 |
| JP | 2003330618 | 11/2003 |
| JP | 2004005516 | 1/2004 |
| JP | 200667061 | 3/2006 |
| JP | 2007-170995 | 7/2007 |
| JP | 2008046070 | 2/2008 |
| JP | 2009032570 | 2/2009 |
| WO | 0131733 | 5/2001 |
| WO | 02/05443 | 1/2002 |
| WO | 2004010528 | 1/2004 |
| WO | 2004112187 | 12/2004 |
| WO | 2005112280 | 11/2005 |
| WO | 2006060232 | 6/2006 |
| WO | 2007124333 | 1/2007 |
| WO | 2007116790 | 10/2007 |
| WO | 2008/078142 | 7/2008 |
| WO | 2009022387 | 2/2009 |
| WO | 2009149023 | 12/2009 |
| WO | 2011022067 | 2/2011 |
| WO | 2013123109 A1 | 8/2013 |
| WO | 2013165419 | 11/2013 |

OTHER PUBLICATIONS

Jiang et al., U.S. Appl. No. 13/864,968, filed Apr. 17, 2013.

Schlub et al., U.S. Appl. No. 13/420,728, filed Mar. 14, 2012.

Liu et al., MEMS-Switched, Frequency-Tunable Hybrid Slot/PIFA Antenna; IEEE Antennas and Wireless Propagation Letters, vol. 8, 2009; p. 311-314.

Myllmaki et al., "Capacitive recognition of the user's hand grip position in mobile handsets", Progress in Electromagnetics Research B, vol. 22, 2010, pp. 203-220.

"CapTouch Programmable Controller for Single-Electrode Capacitance Sensors", AD7147 Data Sheet Rev. B, [online], Analog Devices, Inc., [retrieved on Dec. 7, 2009], <URL: http://www.analog.com/static/imported-files/data_sheets/AD7147.pdf>.

Pance et al., U.S. Appl. No. 61/235,905, filed Aug. 21, 2009.

The ARRL Antenna Book, Published by the American Radio League, 1998, 15th Edition, ISBN: 1-87259-206-5.

Pascolini et al., U.S. Appl. No. 14/710,377, filed May 12, 2015.

Azad et al., U.S. Appl. No. 15/066,419, filed May 10, 2016.

* cited by examiner

ELECTRONIC DEVICE WITH SLOT ANTENNA AND PROXIMITY SENSOR

BACKGROUND

This relates generally to electronic devices and, more particularly, to electronic devices with antennas.

Electronic devices often include antennas. For example, cellular telephones, computers, and other devices often contain antennas for supporting wireless communications.

It can be challenging to form electronic device antenna structures with desired attributes. In some wireless devices, the presence of conductive housing structures can influence antenna performance. Antenna performance may not be satisfactory if the housing structures are not configured properly and interfere with antenna operation. Device size can also affect performance. It can be difficult to achieve desired performance levels in a compact device, particularly when the compact device has conductive housing structures. Challenges also arise when incorporating sensors into electronic devices with conductive housing structures.

It would therefore be desirable to be able to provide improved wireless circuitry for electronic devices such as electronic devices that include conductive housing structures.

SUMMARY

An electronic device may be provided with antennas. The antennas for the electronic device may be formed from slot antenna structures. A slot antenna structure may include portions of a metal housing for an electronic device. A dielectric antenna window may be formed in the metal housing. Metal structures on the dielectric antenna window and portions of the metal housing may be separated by an antenna slot that is used in forming a slot antenna.

The antenna slot in a slot antenna may be indirectly fed. Proximity sensor electrodes for a capacitive proximity sensor may be formed by first and second metal layers overlapping the dielectric antenna window. The first metal layer may be located between the second metal layer and the antenna window. A notch may be formed in the first and second metal layers to locally widen the antenna slot at an open end of the antenna slot. The second metal layer may be shorted to the metal electronic device housing at an opposing closed end of the antenna slot.

DETAILED DESCRIPTION

Electronic devices may be provided with antennas. The antennas may include slot antennas formed in device structures such as electronic device housing structures. Illustrative electronic devices that have housings that accommodate slot antennas are shown in FIGS. 1, 2, 3, and 4.

Figure 1:
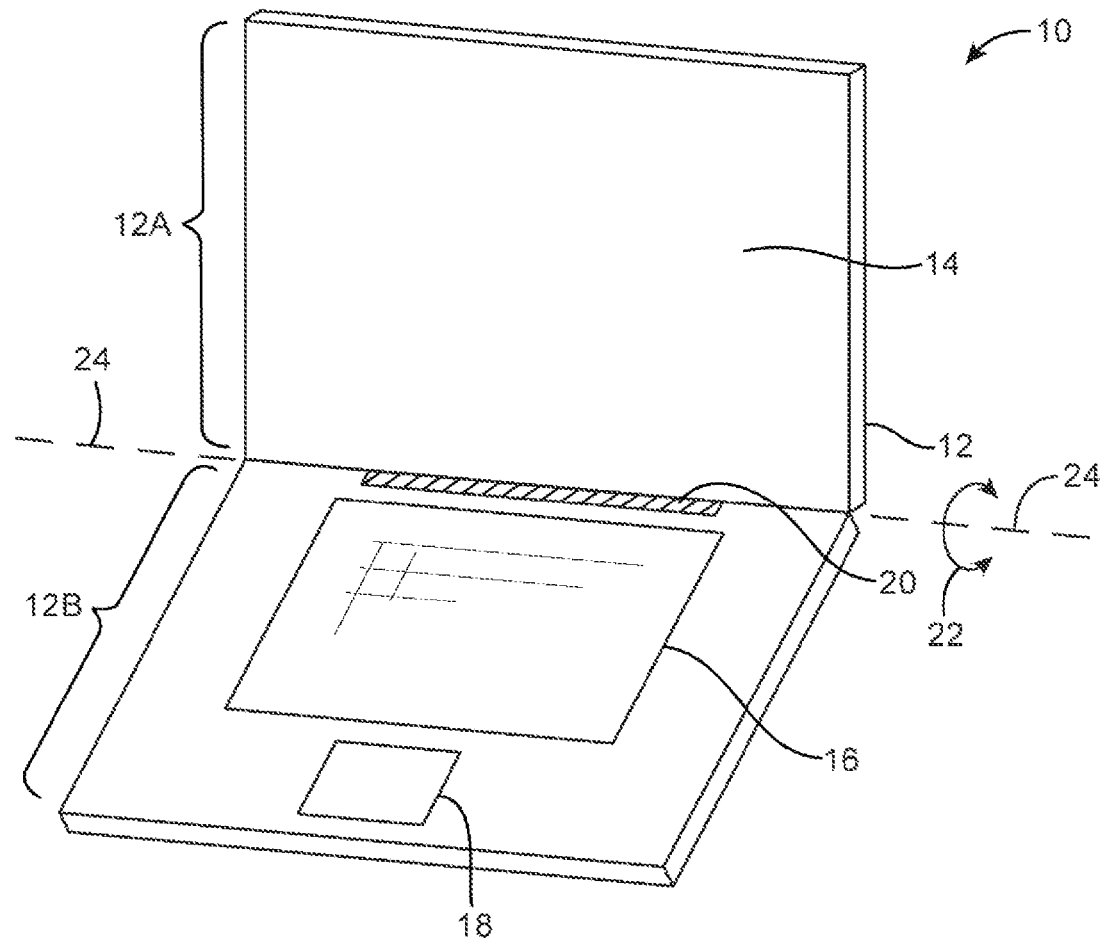
FIG. 1 is a perspective view of an illustrative electronic device such as a laptop computer in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
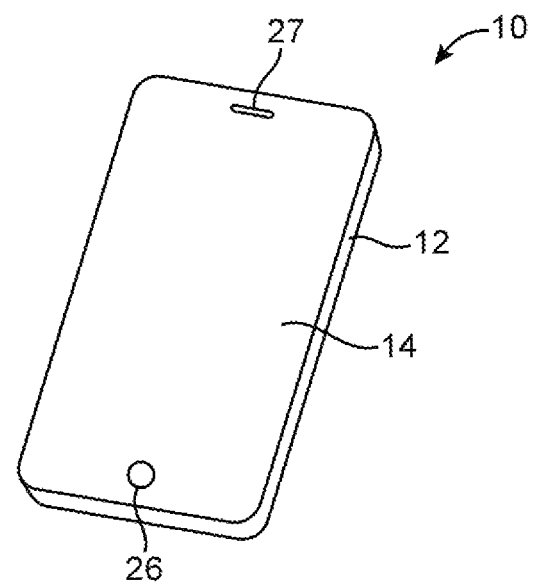
FIG. 2 is a perspective view of an illustrative electronic device such as a handheld electronic device in accordance with an embodiment.

FIG. 2 shows an illustrative configuration for electronic device 10 based on a handheld device such as a cellular telephone, music player, gaming device, navigation unit, or other compact device. In this type of configuration for device 10, device 10 has opposing front and rear surfaces. The rear surface of device 10 may be formed from a planar portion of housing 12. Display 14 forms the front surface of device 10. Display 14 may have an outermost layer that includes openings for components such as button 26 and speaker port 27.

Figure 3:
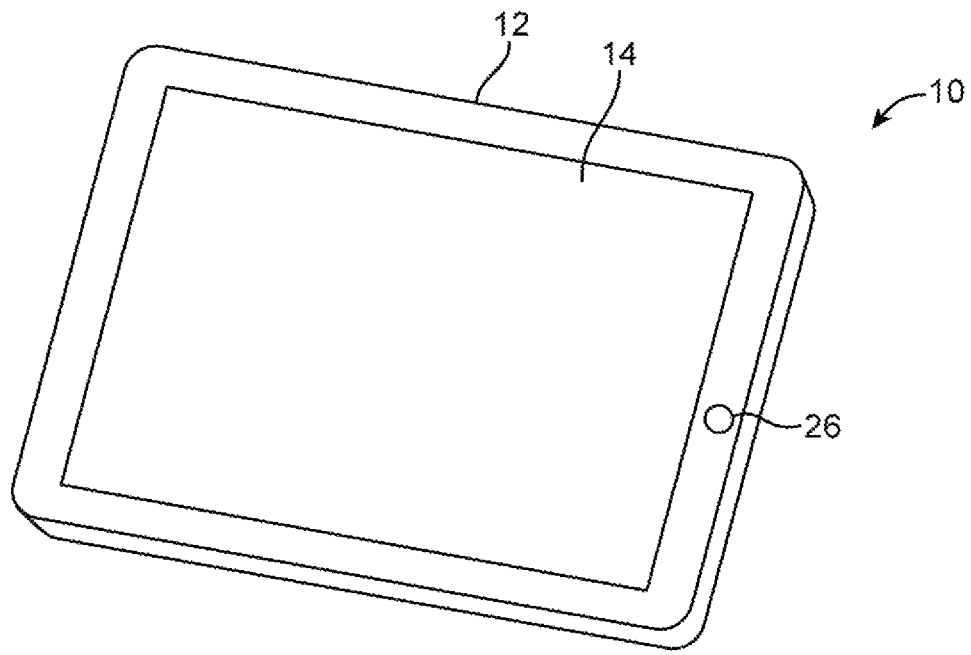
FIG. 3 is a perspective view of an illustrative electronic device such as a tablet computer in accordance with an embodiment.

In the example of FIG. 3, electronic device 10 is a tablet computer. In electronic device 10 of FIG. 3, device 10 has opposing planar front and rear surfaces. The rear surface of device 10 is formed from a planar rear wall portion of housing 12. Curved or planar sidewalls may run around the periphery of the planar rear wall and may extend vertically upwards. Display 14 is mounted on the front surface of device 10 in housing 12. As shown in FIG. 3, display 14 has an outermost layer with an opening to accommodate button 26.

Figure 4:
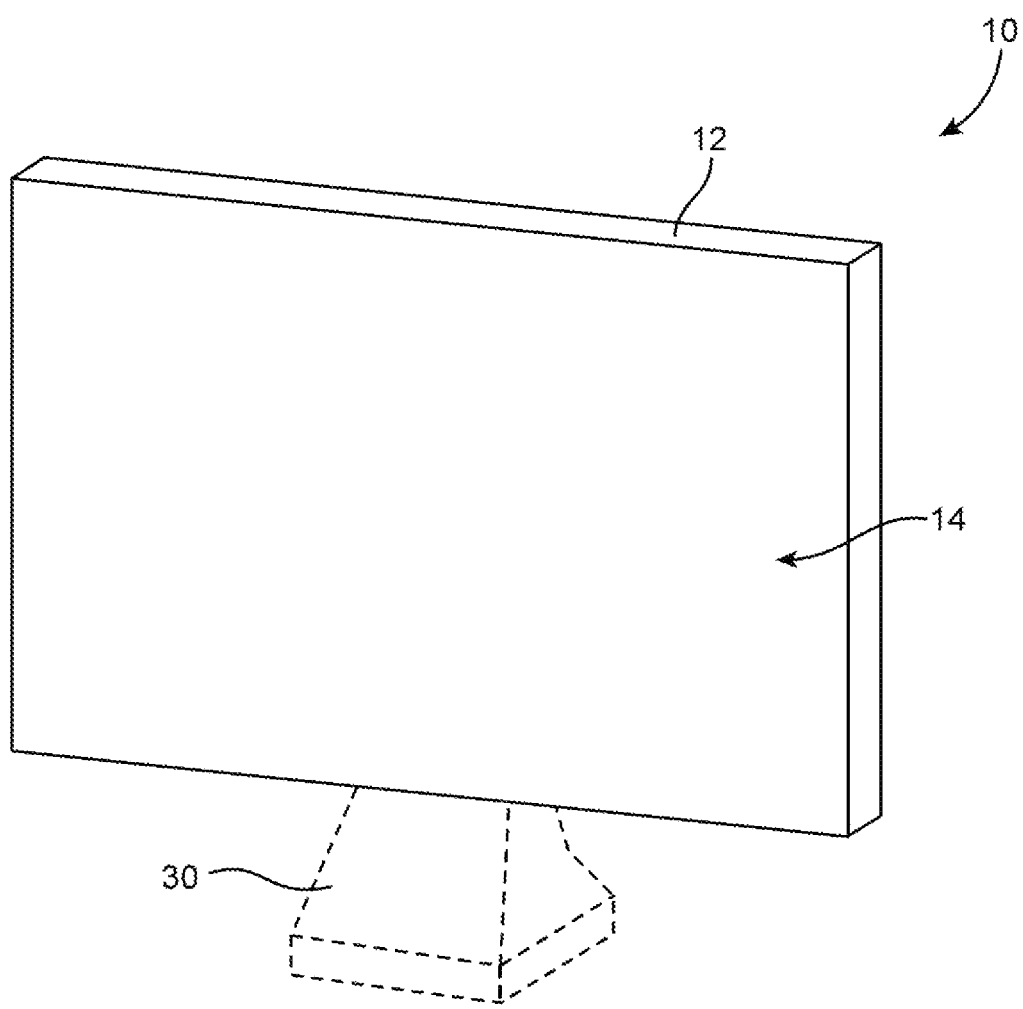
FIG. 4 is a perspective view of an illustrative electronic device such as a display for a computer or television in accordance with an embodiment.

FIG. 4 shows an illustrative configuration for electronic device 10 in which device 10 is a computer display, a computer that has an integrated computer display, or a television. Display 14 is mounted on a front face of device 10 in housing 12. With this type of arrangement, housing 12 for device 10 may be mounted on a wall or may have an optional structure such as support stand 30 to support device 10 on a flat surface such as a tabletop or desk.

An electronic device such as electronic device 10 of FIGS. 1, 2, 3, and 4, may, in general, be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. The examples of FIGS. 1, 2, 3, and 4 are merely illustrative.

Device 10 may include a display such as display 14. Display 14 may be mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button, an opening may be formed in the display cover layer to accommodate a speaker port, etc.

Housing 12 may be formed from conductive materials and/or insulating materials. In configurations in which housing 12 is formed from plastic or other dielectric materials, antenna signals can pass through housing 12. Antennas in this type of configuration can be mounted behind a portion of housing 12. In configurations in which housing 12 is formed from a conductive material (e.g., metal), it may be desirable to provide one or more radio-transparent antenna windows in openings in the housing. As an example, a metal housing may have openings that are filled with plastic antenna windows. Antennas may be mounted behind the antenna windows and may transmit and/or receive antenna signals through the antenna windows.

Figure 5:
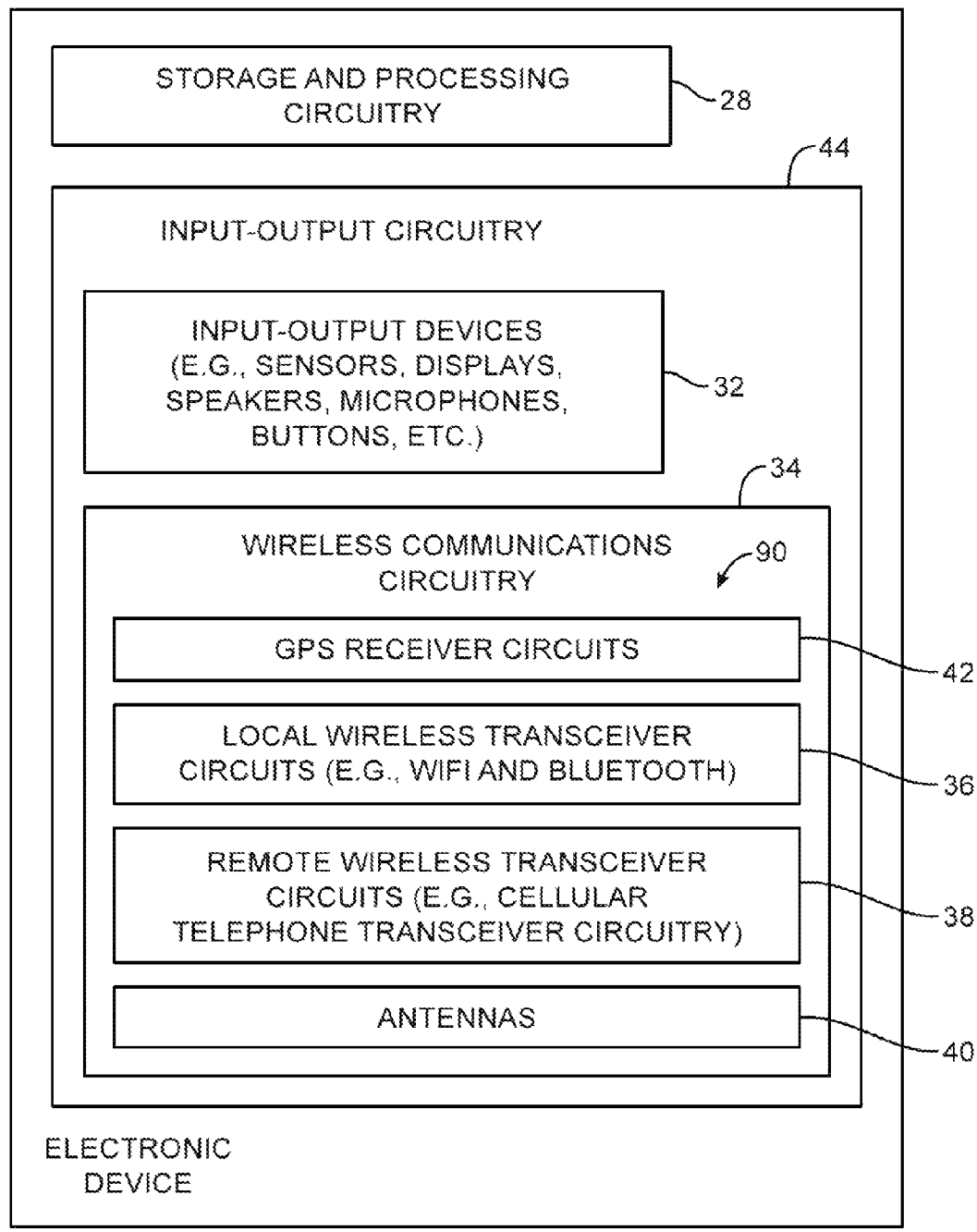
FIG. 5 is a schematic diagram of illustrative circuitry in an electronic device in accordance with an embodiment.

A schematic diagram showing illustrative components that may be used in device 10 is shown in FIG. 5. As shown in FIG. 5, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band. Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include satellite navigation system circuitry such as global positioning system (GPS) receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Figure 6:
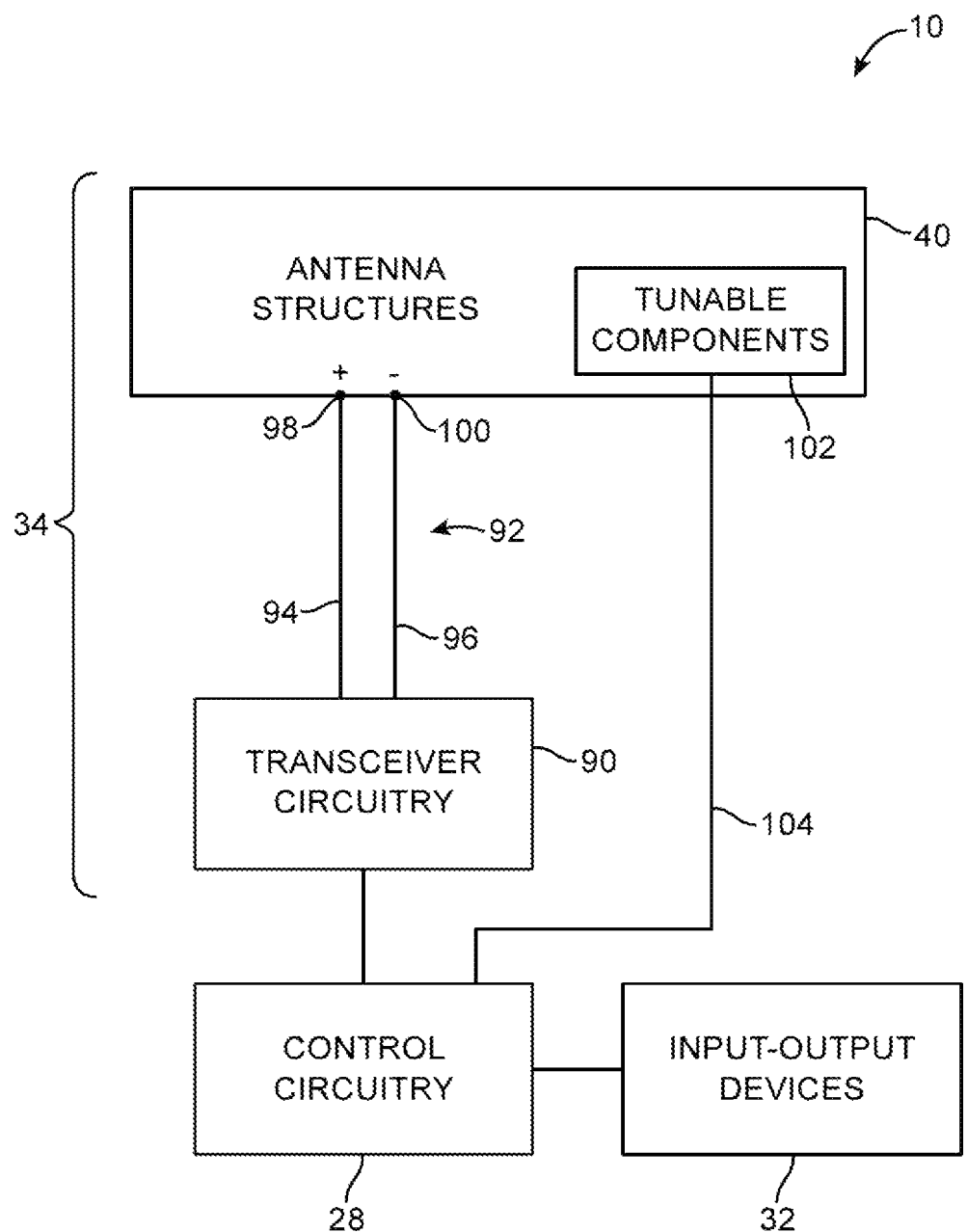
FIG. 6 is a schematic diagram of illustrative wireless circuitry in accordance with an embodiment.

As shown in FIG. 6, transceiver circuitry 90 in wireless circuitry 34 may be coupled to antenna structures 40 using paths such as path 92. Wireless circuitry 34 may be coupled to control circuitry 28. Control circuitry 28 may be coupled to input-output devices 32. Input-output devices 32 may supply output from device 10 and may receive input from sources that are external to device 10.

To provide antenna structures 40 with the ability to cover communications frequencies of interest, antenna structures 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna structures 40 may be provided with adjustable circuits such as tunable components 102 to tune antennas over communications bands of interest. Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures.

During operation of device 10, control circuitry 28 may issue control signals on one or more paths such as path 104 that adjust inductance values, capacitance values, or other parameters associated with tunable components 102, thereby tuning antenna structures 40 to cover desired communications bands.

Path 92 may include one or more transmission lines. As an example, signal path 92 of FIG. 6 may be a transmission line having a positive signal conductor such as line 94 and a ground signal conductor such as line 96. Lines 94 and 96 may form parts of a coaxial cable or a microstrip transmission line (as examples). A matching network formed from components such as inductors, resistors, and capacitors may be used in matching the impedance of antenna structures 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna structures 40.

Transmission line 92 may be directly coupled to an antenna resonating element and ground for antenna 40 or may be coupled to near-field-coupled antenna feed structures that are used in indirectly feeding a resonating element for antenna 40. As an example, antenna structures 40 may form an inverted-F antenna, a slot antenna, a hybrid inverted-F slot antenna or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 100. As another example, antenna structures 40 may include an antenna resonating element such as a slot antenna resonating element or other element that is indirectly fed using near-field coupling. In a nearfield coupling arrangement, transmission line 92 is coupled to a near-field-coupled antenna feed structure that is used to indirectly feed antenna structures such as an antenna slot or other element through near-field electromagnetic coupling.

Figure 7:
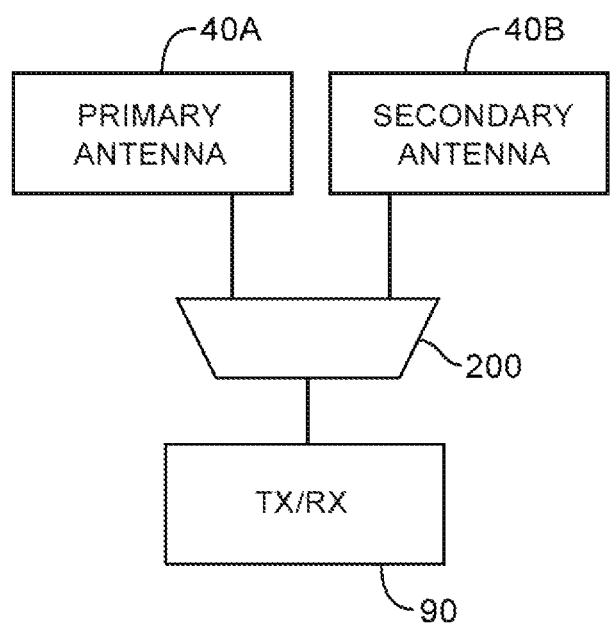
FIG. 7 is a schematic diagram of illustrative wireless circuitry in which multiple antennas have been coupled to transceiver circuitry using switching circuitry in accordance with an embodiment.

As shown in FIG. 7, antenna structures 40 may include multiple antennas such as secondary antenna 40A and primary antenna 40B. Primary antenna 40B may be used for transmitting and receiving wireless signals. Secondary antenna 40A may be switched into use when antenna 40B is blocked or otherwise degraded in performance (e.g., to receive and, if desired, to transmit wireless signals). Switching circuitry 200 may be used to select which of antennas 40A and 40B is coupled to transceiver circuitry 90. If desired, primary antenna 40B and/or secondary antenna 40A may cover multiple frequency bands of interest (e.g., a low band cellular band, a midband cellular band including GPS coverage, and a high band cellular band that may cover 2.4 GHz communications, if desired). Other communications band may be covered using antennas 40A and 40B, if desired.

Figure 8:
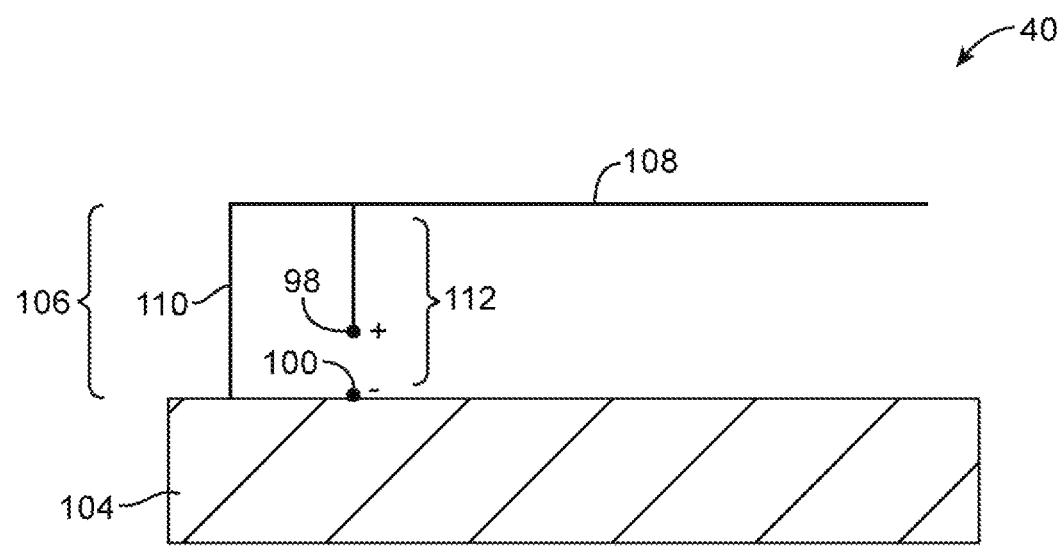
FIG. 8 is a diagram of an illustrative inverted-F antenna in accordance with an embodiment.

FIG. 8 is a diagram of illustrative inverted-F antenna structures that may be used in forming an antenna in device 10. Inverted-F antenna 40 of FIG. 8 has antenna resonating element 106 and antenna ground (ground plane) 104. Antenna resonating element 106 may have a main resonating element arm such as arm 108. The length of arm 108 may be selected so that antenna 40 resonates at desired operating frequencies. For example, if the length of arm 108 may be a quarter of a wavelength at a desired operating frequency for antenna 40. Antenna 40 may also exhibit resonances at harmonic frequencies.

Main resonating element arm 108 may be coupled to ground 104 by return path 110. Antenna feed 112 may include positive antenna feed terminal 98 and ground antenna feed terminal 100 and may run in parallel to return path 110 between arm 108 and ground 104. If desired, inverted-F antennas such as illustrative antenna 40 of FIG. 4 may have more than one resonating arm branch (e.g., to create multiple frequency resonances to support operations in multiple communications bands) or may have other antenna structures (e.g., parasitic antenna resonating elements, tunable components to support antenna tuning, etc.). A planar inverted-F antenna (PIFA) may be formed by implementing arm 108 using planar structures (e.g., a planar metal structure such as a metal patch or strip of metal that extends into the page of FIG. 8).

Figure 9:
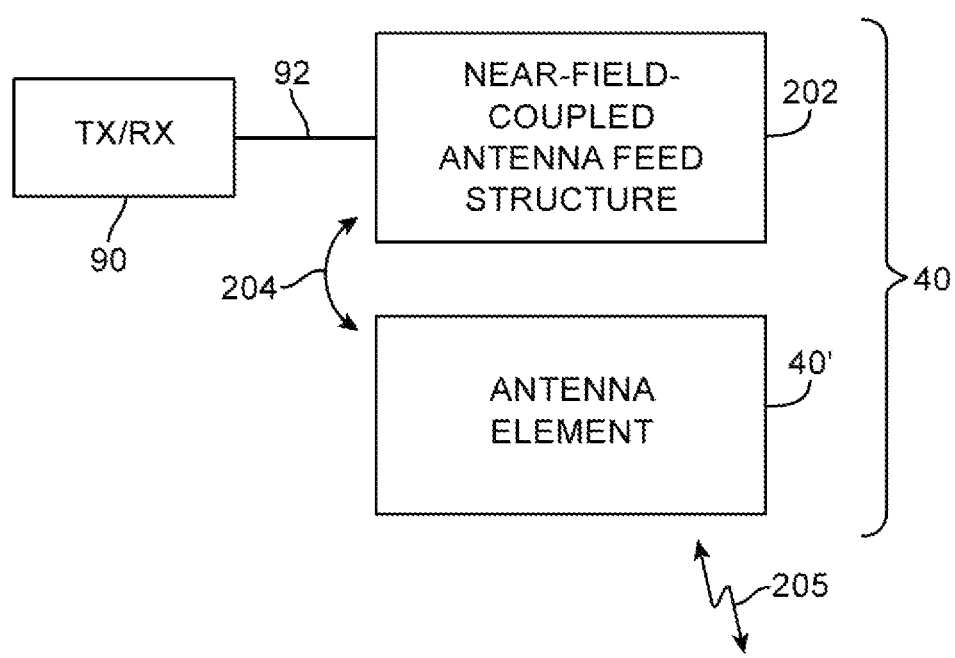
FIG. 9 is a diagram of an illustrative antenna that is fed using near-field coupling in accordance with an embodiment.

FIG. 9 shows how antenna 40 may be indirectly fed using a near-field coupling arrangement. With this type of arrangement, transceiver 90 is connected to near-field-coupled antenna feed structure 202 by transmission line 92. Antenna 40 may include a resonating element such as a slot or other antenna resonating element structure (antenna element 40'). Structure 202 may include a strip of metal, a patch of metal, planar metal members with other shapes, a loop of metal, or other structure that is near-field coupled to antenna resonating element 40' by near-field coupled electromagnetic signals 204. Structure 202 does not produce significant far-field radiation during operation (i.e., structure 202 does not itself form a far-field antenna but rather serves as a coupled feed for a slot antenna structure or other antenna resonating element structure for antenna 40). During operation, the indirect feeding of element 40' by structure 202 allows antenna element 40' and therefore antenna 40 to receive and/or transmit far-field wireless signals 205 (i.e., radio-frequency antenna signals for antenna 40).

Figure 10:
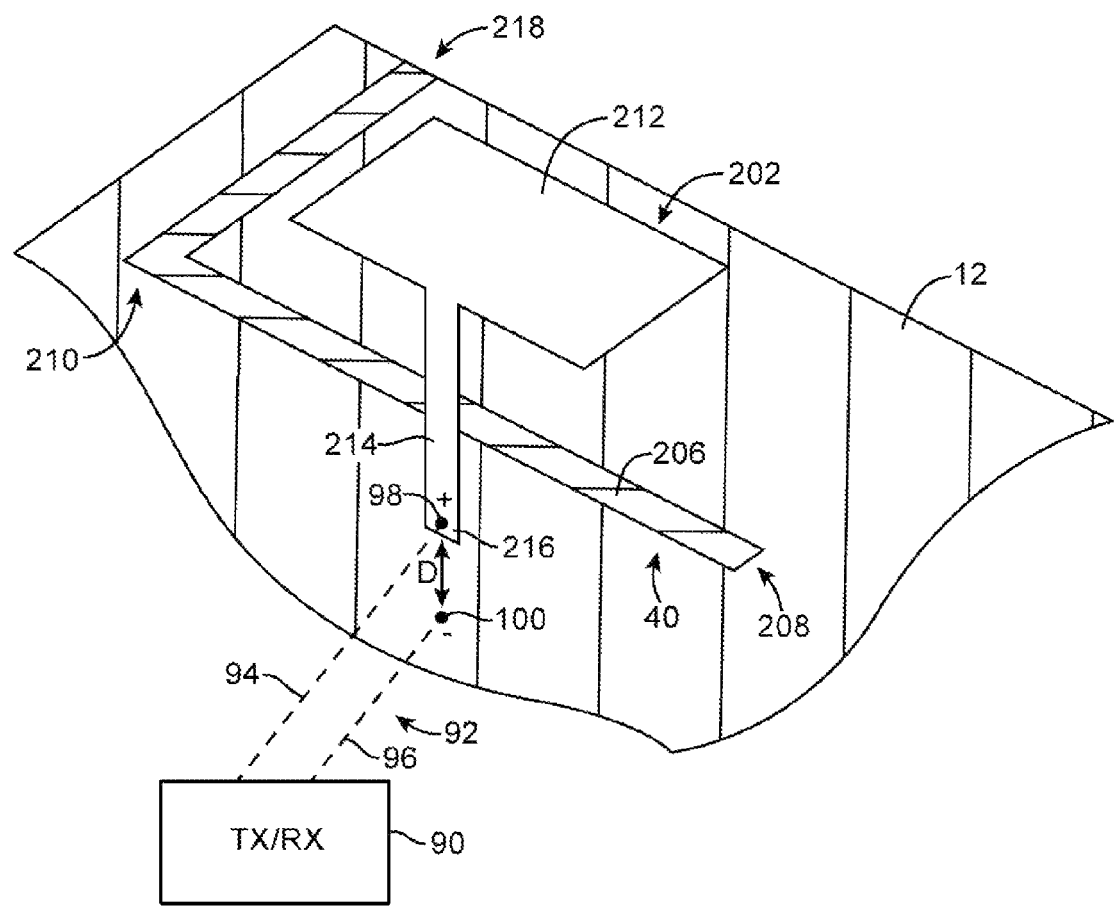
FIG. 10 is a perspective view of a slot antenna being fed using near-field coupling in accordance with an embodiment.

A perspective view of an illustrative indirectly feed (coupled feed) configuration in which a slot-based antenna is being indirectly fed is shown in FIG. 10. With the arrangement of FIG. 10, antenna 40 is a slot-based antenna formed from antenna slot 206 in a ground plane structure such as metal housing 12 of device 10. Slot 206 may be filled with plastic or other dielectric. In the example of FIG. 10, slot 206 has an open end such as end 218 and an opposing closed end such as closed end 208. A slot antenna such as slot antenna 40 of FIG. 10 that has an open end and a closed end may sometimes be referred to as an open slot antenna. If desired, slot antenna 40 may be a closed slot antenna (i.e., end 218 may be closed by providing a short circuit path across the slot opening at end 218 so that both ends of the slot are closed). Slot antenna 40 of FIG. 10 is based on a slot that has bend 210. If desired, slots for slot antennas such as slot 206 may be provided with two bends, three or more bends, etc. The example of FIG. 10 is merely illustrative.

Slot antenna 40 may be near-field coupled to near-field-coupled antenna feed structure 202. Structure 202 may be formed from a patch of metal such as patch 212 with a bent leg such as leg 214. Leg 214 extends downwards towards ground plane 12. Tip 216 of leg 214 is separated from ground plane 12 by air gap D (i.e., tip 216 is not directly connected to ground 12).

Transceiver circuitry 90 is coupled to antenna feed terminals such as terminals 98 and 100 by transmission line 92. Terminal 98 may be connected to tip portion 216 of leg 214 of near-field-coupled antenna feed structure 202. Terminal 100 may be connected to ground structure 12. Positive signal line 94 may be coupled to terminal 98. Ground signal line 96 may be coupled to terminal 100.

Near-field-coupled antenna feed structure 202 is near-field coupled to slot antenna 40 by near-field electromagnetic signals and forms an indirect antenna feed for antenna 40. During operation, transceiver circuitry 90 can transmit and receive wireless radio-frequency antenna signals with antenna 40 (i.e., with slot 206) using coupled feed structure 202.

Figure 11:
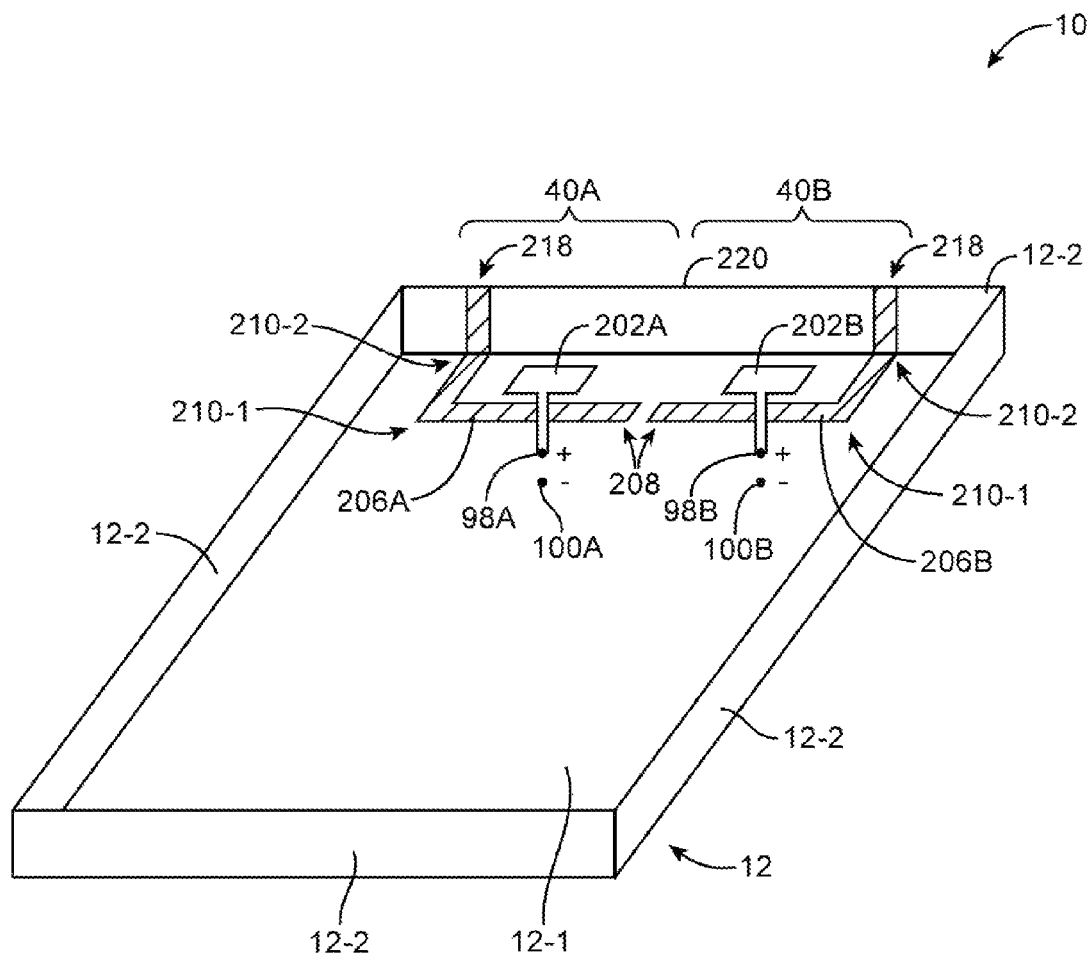
FIG. 11 is a perspective view of an interior portion of an electronic device housing having a pair of slots and associated near-field coupling structures in accordance with an embodiment.

FIG. 11 is a perspective interior view of an illustrative configuration that may be used for housing 12. Housing 12 of FIG. 11 has a rear wall such as planar rear wall 12-1 and has flat or curved sidewalls 12-2 that run around the periphery of rear wall 12-1 and that extend vertically upwards to support display 14 (not shown in FIG. 11).

Slots 206A and 206B are formed in housing walls 12-1 and 12-2. Plastic or other dielectric may be used to fill slots 206A and 206B. Slots 206A and 206B may be open ended slots having closed ends 208 and open ends 218 or one or both of slots 206A and 206B may be closed slots. Slots 206A and 206B may have bends such as bends 210-1 and 210-2 that allow slots 206A and 206B to extend across portions of rear wall 12-1 and up side walls 12-2. Openings 218 may be formed along upper edge 220 of housing sidewall 12. Near-field-coupled antenna feed structure 202A is electromagnetically coupled to slot 206A and allows slot antenna 40A to be indirectly feed by transceiver circuitry 90 using terminals 98A and 100A. Near-field-coupled antenna feed structure 202B is electromagnetically coupled to slot 206B and allows slot antenna 40B to be indirectly feed by transceiver circuitry 90 using terminals 98B and 100B. Switching circuitry such as switching circuitry 200 of FIG. 7 may be used to couple transceiver circuitry 90 to antennas 40A and 40B. Antenna 40A may be a secondary antenna and antenna 40B may be a primary antenna (or vice versa). Additional indirectly fed slot antennas 40 may be incorporated into housing 12, if desired. The two-antenna configuration of FIG. 11 is merely illustrative.

Figure 12:
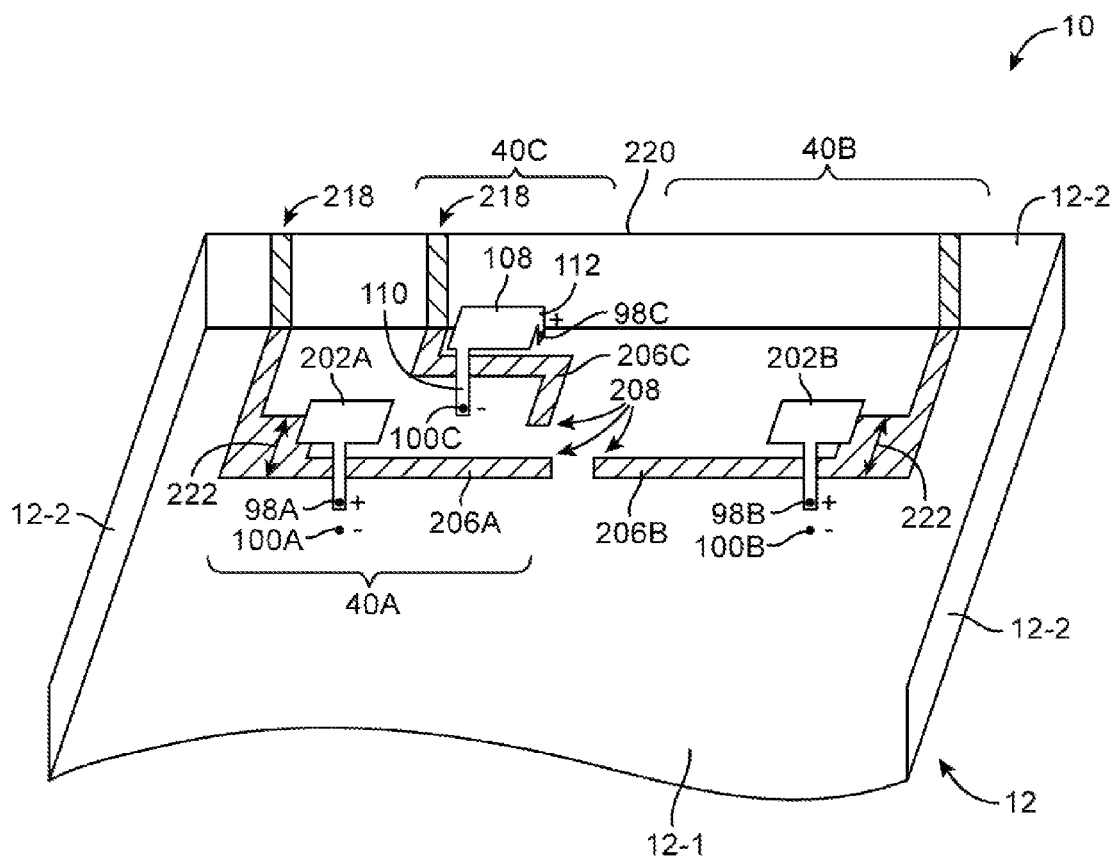
FIG. 12 is a perspective view of an illustrative interior portion of an electronic device having electronic device housing slots with multiple widths that are fed using near-field coupling structures and having a hybrid antenna that includes a planar inverted-F antenna structure and a slot antenna structure in accordance with an embodiment.

FIG. 12 is a perspective interior view of another illustrative configuration that may be used for providing slot antennas in housing 12. Housing 12 of FIG. 12 has a rear wall such as planar rear wall 12-1 and has flat or curved sidewalls 12-2 that extend upwards from the rear wall around the periphery of device 10. Slots 206A, 206B, and 206C may be formed in housing walls 12-1 and 12-2. Plastic or other dielectric may be used to fill slots 206A, 206B, and 206C. Slots 206A, 206B, and 206C may be open ended slots having closed ends 208 and open ends 218 or one or more of slots 206A, 206B, and 206C may be closed slots that are surrounded on all sides by metal (e.g., metal housing 12).

Slots 206A, 206B, and 206C may have bends that allow slots 206A, 206B, and 206C to extend across portions of rear wall 12-1 and up a given one of sidewalls 12-2. Openings 218 may be formed along upper edge 220 of housing wall 12. Slots 206A and 206B may have locally widened portions such as portions 222 (i.e., portions along the lengths of slots 206A and 206B where the widths of the slots have been widened relative to the widths of the slots elsewhere along their lengths). The locally widened slot portion of each slot may exhibit a reduced capacitance that improves low band antenna efficiency.

Antennas 40A and 40B may be indirectly fed slot antennas. Near-field-coupled antenna feed structure 202A may be electromagnetically coupled to slot 206A and may allow slot antenna 40A to be indirectly feed by transceiver circuitry 90 using terminals 98A and 100A. Near-field-coupled antenna feed structure 202B may be electromagnetically coupled to slot 206B and may allow slot antenna 40B to be indirectly feed by transceiver circuitry 90 using terminals 98B and 100B. Switching circuitry such as switching circuitry 200 of FIG. 7 may be used to couple transceiver circuitry 90 to antennas 40A and 40B. Antenna 40A may be a secondary antenna and antenna 40B may be a primary antenna (or vice versa).

Antenna 40C may be a hybrid antenna that incorporates a slot antenna and a planar inverted-F antenna. The slot antenna portion of antenna 40C may be formed from slot 206C. The planar inverted-F portion of antenna 40C may be formed from a planar inverted-F antenna having main planar resonating element portion 108 (e.g., a rectangular metal patch or a planar metal structure with another suitable shape), a downward-extending leg forming feed path 112, and another downward-extending leg forming return path 110. Antenna 40C may be fed using positive antenna feed terminal 98C (i.e., a feed terminal on the tip of leg 112 that is separated from ground 12-1 by an air gap or other dielectric gap) and ground antenna feed terminal 100C (e.g., a terminal directly shorted to ground 12 on an opposing side of slot 206C from terminal 98C or shorted to ground 12 elsewhere on rear wall 12-1).

Antenna 40C may operate in one or more communications bands of interest. Both the slot antenna portion of antenna 40C formed from slot 206C and the planar inverted-F antenna portion of antenna 40C may contribute to the antenna performance of antenna 40C (i.e., both the slot antenna and planar inverted-F antenna may contribute to the antenna resonances of antenna 40C). This allows the hybrid antenna to effectively cover communications frequencies of interest. With one suitable arrangement, antenna 40C may operate in 2.4 GHz and 5 GHz communications bands (e.g., to support wireless local area network communications).

Figure 13:
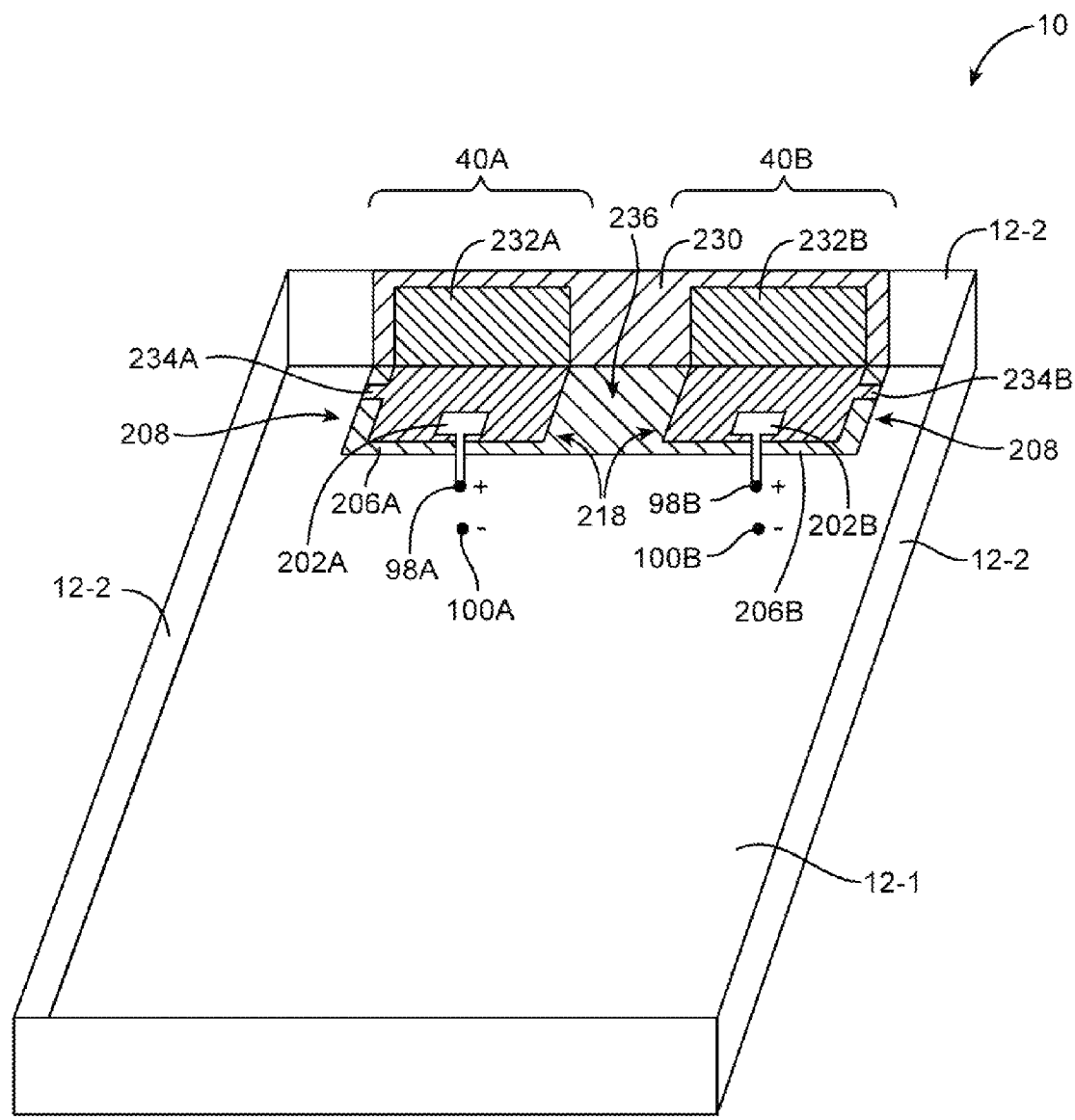
FIG. 13 is a perspective view of an illustrative interior portion of an electronic device having slot antennas formed from metal traces on a plastic antenna window in a metal housing for the electronic device in accordance with an embodiment.

If desired, antennas for device 10 may be formed from antenna slots that are formed using both metal portions of housing 12 and metal structures on a plastic antenna window structure. This type of arrangement is shown in FIG. 13. The arrangement of FIG. 13 includes antennas 40A and 40B. If desired, a third antenna (see, e.g., antenna 40C of FIG. 12) may be incorporated into device 10 of FIG. 13. The configuration of FIG. 13 is merely illustrative.

As shown in FIG. 13, metal housing 12 may include metal rear wall 12-1 and metal sidewalls 12-2 (e.g., curved and/or planar sidewalls). Antenna window 230 may be formed from a plastic structure or other dielectric member mounted in an opening in device housing 12 at one of the ends of device 12 or elsewhere in housing 12. Metal structures may be formed on the interior surface of antenna window 230 such as metal structure 232A and metal structure 232B. Metal structures 232A and 232B may be formed from patterned sheet metal (e.g., sheet metal attached to the inner surface of antenna window 230 by adhesive, heat stakes, or other fastening arrangements), metal in a flexible printed circuit (e.g., a flexible printed circuit that is attached to the inner surface of antenna window 230 by adhesive, heat stakes, or other fastening arrangements), metal traces that are globally deposited (e.g., using physical vapor deposition) and subsequently patterned (e.g., using photolithography), patterned metal traces that are deposited using screen printing, pad printing, ink-jet printing, laser-based processing, or other deposition techniques, or other patterned metal structures.

The shape of metal structures 232A and 232B and the shape of housing 12 are used to define the shapes of slots 206A and 206B. Metal structures 232A and 232B of FIG. 13 run along one side of each slot, whereas portions of housing 12 run along the opposing side of each slot. In the illustrative configuration of FIG. 13, slots 206A and 206B have open ends 218 that face one another in the middle of antenna window 230. Region 236 between antennas 40A and 40B may be used for components (e.g., a camera, a microphone, other input-output devices 32, etc.). Portion 234A of metal structure 232A forms a closed end 208 for slot 206A. Portion 234B of metal structure 232B forms a closed end 208 for slot 206B. Slot 206A may be indirectly fed using structure 202A to form indirectly fed slot antenna 40A. Slot 206B may be indirectly fed using structure 202B to form indirectly fed slot antenna 40B.

If desired, slot antennas in housing 12 may be provided with electrical components such as inductors, capacitors, resistors, and more complex circuitry formed from multiple circuit elements such as these. The components may be packed in surface mount technology (SMT) packages or other packages.

Figure 14:
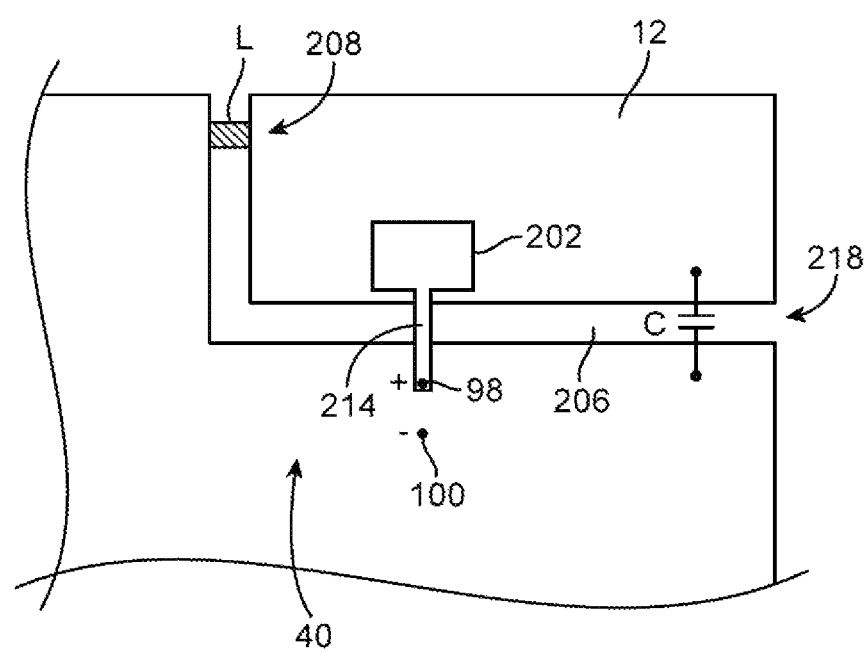
FIG. 14 is a diagram showing how electrical components may be incorporated into a slot antenna to adjust antenna performance in accordance with an embodiment.

The presence of additional electrical components in an antenna may be used to adjust antenna performance, so the antenna covers desired operating frequencies of interest. Consider, as an example, indirectly fed slot antenna 40 of FIG. 14. As shown in FIG. 14, antenna 40 may have a near-field-coupled antenna feed structure 202 that is used to provide an indirect feed arrangement for slot antenna 40. Transceiver circuitry 90 may be coupled to feed terminals 98 and 100, as described in connection with FIG. 10. Capacitor C and/or inductor L may be incorporated into antenna 40 using surface mount technology components or other electrical components. One or more capacitors such as capacitor C may, for example, bridge slot 206 at one or more locations along the length of slot 206. Capacitor C may be implemented using a discrete capacitor or other capacitor structures. Inductor L may be used to form closed end 208 of slot 206 and may be formed from a discrete inductor and/or a length of metal with an associated inductance. The inclusion of capacitor C into antenna 40 may help reduce the size of antenna 40 (e.g., the length of slot 206) while ensuring that antenna 40 can continue to operate in desired communications bands. The inclusion of inductor L into antenna 40 may somewhat reduce low band antenna efficiency, but will also help reduce the size of antenna 40 (e.g., by minimizing slot length). Elements such as inductor L and capacitor C may, if desired, be tunable elements so that antenna 40 can be tuned to cover frequencies of interest, as described in connection with tunable components 102 of FIG. 6. The use of coupled (indirect) feeding arrangements for the slot antennas in device 10 may help increase antenna bandwidth while minimizing slot length requirements (e.g., by shifting maximum antenna currents towards the edge of housing 12 or via other mechanisms). Other types of feeding arrangements may be used, if desired.

It may be desirable to incorporate sensor circuitry into device 10. For example, proximity sensor circuitry can be used to sense whether a user's body or other external object is in the vicinity of device 10. A proximity sensor may be implemented using a capacitive proximity sensor configuration in which capacitance measurements are made using capacitor electrodes. The capacitance measurements may reveal whether or not an external object is within a given distance of the capacitive proximity sensor so that device 10 can take appropriate action. As an example, capacitive proximity sensor data can be used in controlling radio-frequency transmit powers to ensure that wireless circuitry in device 10 satisfies design constraints.

To minimize space within device 10, one or more of the antennas in device 10 may be implemented using conductive structures that serve as both antenna resonating element structures and capacitive proximity sensor electrodes. For example, some or all of a slot antenna ground plane can serve as capacitive proximity sensor electrodes.

Figure 15:
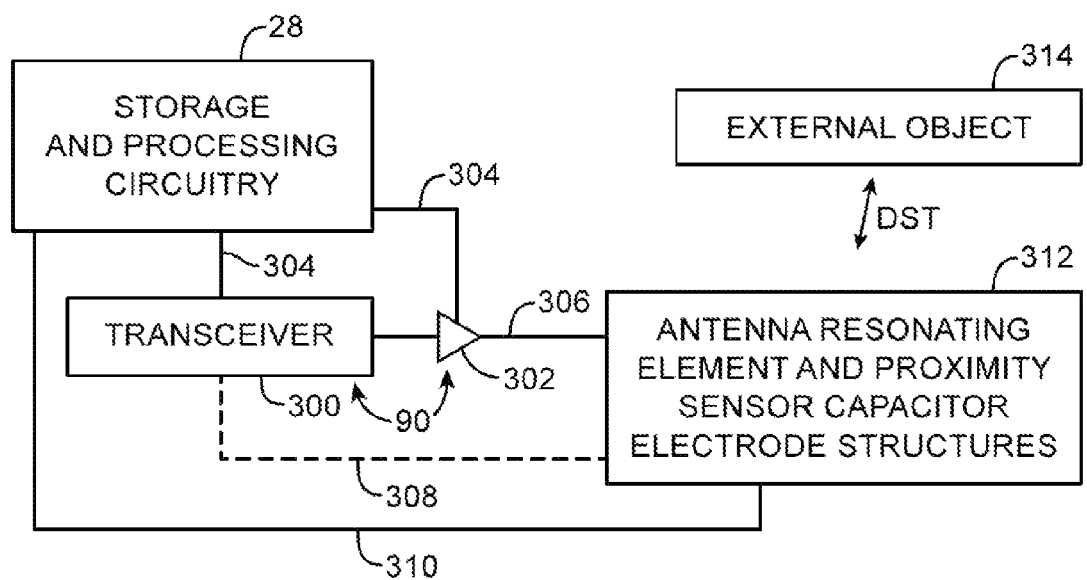
FIG. 15 is a diagram of illustrative wireless circuitry that includes capacitive proximity sensor electrode structures formed from metal antenna structures in accordance with an embodiment.

As shown in FIG. 15, conductive structures for forming an antenna in device 10 and for forming proximity sensor electrodes (i.e., antenna resonating element and proximity sensor capacitor electrode structures 312) may be coupled to a radio-frequency transceiver such as radio-frequency transceiver 300 in transceiver circuitry 90 to transmit and receive antenna signals. The conductive structures may also be coupled to proximity sensor processing circuitry in storage and processing circuitry 28 to make proximity sensor measurements. Proximity sensor signals (e.g., capacitance measurements) from the capacitor electrodes in structures 312 are gathered using the same conductive components that are serving as all or part of a slot antenna or other antenna structure, so these proximity sensor signals are representative of the distance between external objects such as external object 314 and the antenna.

Proximity measurements made using structures 312 may be used in controlling the power of the antenna signals that are transmitted by device 10 through structures 312. Proximity sensor signals (capacitance measurements) may be conveyed to storage and processing circuitry 28 from structures 312 using path 310. The proximity sensor signals (capacitance measurements) from structures 312 may be processed using a capacitance-to-digital converter and/or other sensor signal processing circuits in circuitry 28 to produce analog and/or digital proximity data. The proximity data may, for example, be Boolean data indicating that external object 314 (e.g., a user's body or other external object) is or is not within a given predetermined distance of structures 312 or may be continuous data representing a current distance value for separation distance DST between the antenna and external object 312.

Storage and processing circuitry 28 may be coupled to transceiver circuitry 300 and power amplifier circuitry 302. Dashed line 308 shows how received radio-frequency signals can be conveyed from the antenna that is formed using structures 312 to transceiver circuitry 300. During data transmission operations, paths 304 may be used to convey control signals from storage and processing circuitry 28 to transceiver circuitry 300 and power amplifier circuitry 302 to adjust output powers in real time. For example, when data is being transmitted, transceiver 300 and/or power amplifier 302 can be directed to increase or decrease the power level of the radio-frequency signal that is being provided to the antenna over transmission line 306. Power level adjustments may be made in response to transmit power commands from a wireless network, may be made to cap transmit powers to ensure that regulatory limits for electromagnetic radiation emission are satisfied, and/or may be made to ensure that other desired operating conditions are satisfied.

As an example, transmit power can be set to a relatively high level in response to situations in which the proximity sensor has not detected the presence of external object 314. If, however, proximity sensor measurements indicate that the user's leg or other body part or other external object 314 is in the immediate vicinity of the antenna and proximity sensor formed from structures 312 (e.g., within 20 mm or less, within 15 mm or less, within 10 mm or less, etc.), storage and processing circuitry 28 can respond accordingly by directing transceiver circuitry 300 and/or power amplifier 302 to transmit radio-frequency signals through transmission line 306 and the antenna of structures 312 at reduced powers.

Figure 16:
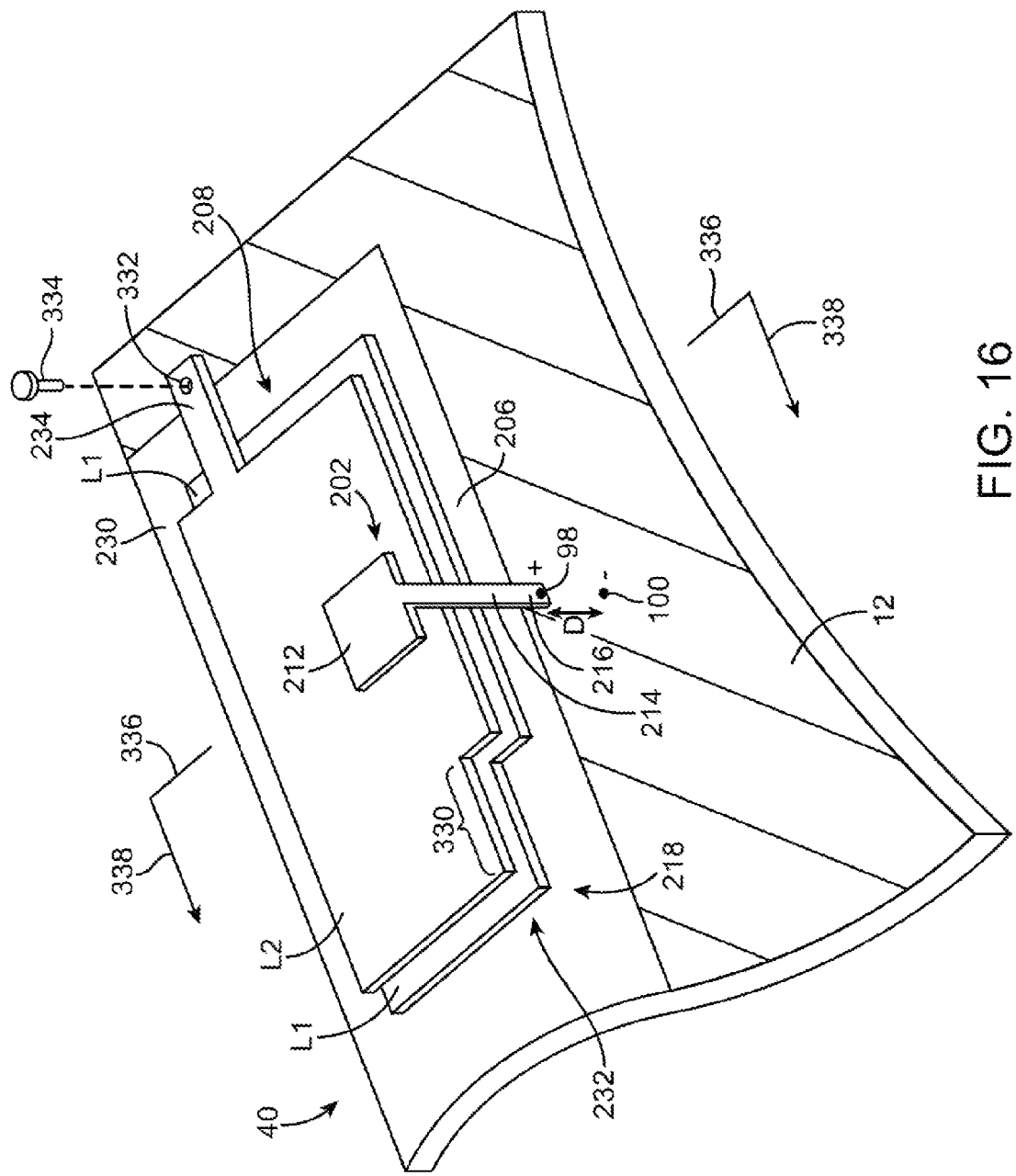
FIG. 16 is a perspective view of illustrative structures of the type that may be used in forming an indirectly fed slot antenna and capacitive proximity sensor electrodes in accordance with an embodiment.

With one embodiment, structures 312 may be formed from metal structures in a slot antenna such as metal structures on one or both sides of slot 206. As shown in FIG. 16, for example, slot antenna 40 may be formed from antenna slot 206 between metal housing 12 and metal structures 232 on the interior surface of dielectric antenna window 230. Metal structures 232 may include a first layer of metal such as lower layer L1. Metal structures 232 may also include a second layer of metal such as upper layer L2. Layer L1 may be interposed between layer L2 and antenna window 230 (e.g., a plastic antenna window).

Layers L1 and L2 may have identical or similar shapes, as shown in FIG. 16. At high frequencies, layers L1 and L2 are effectively shorted together due to the capacitance between layers L1 and L2. This allows layers L1 and L2 to form unitary antenna structures in slot antenna 40 (i.e., layers L1 and L2 are shorted together to form one half of the ground plane for slot antenna 40 while the portions of metal housing 12 on the opposing side of slot 206 form the other half of the ground plane for slot antenna 40). Capacitive proximity sensor measurements are generally made using alternating current (AC) signals at frequencies below the frequencies associated with the antenna signals in device 10. Antenna signals may have frequencies above 700 MHz (as an example). The frequencies associated with operating a capacitive proximity sensor may be, for example, frequencies of 100 MHz or less, 10 MHz or less, or 1 MHz or less. At these lower frequencies, layers L1 and L2 are not shorted together and can serve as proximity sensor electrodes.

Layer L2 may have a protruding portion such as tab 234 that extends across the dielectric of window 230 and forms end 208 of slot 206. Tab 234 may be grounded to housing 12 and serves as a signal pathway for layer L2 at end 208. A capacitor of about 50 pF or other suitable value may be interposed in this path. The capacitor may be shorted at antenna frequencies so that L1 and L2 may serve as part of the ground plane for antenna 40. The capacitor may be open at proximity sensor frequencies to ensure proper operation of the proximity sensor formed from layers L1 and L2.

Tab 234 may be shorted to housing 12 by attaching tab 234 to housing 12 using solder, welds, fasteners, conductive adhesive, or other suitable attachment mechanisms. As shown in the example of FIG. 16, tab 234 may have an opening such as opening 332 that accommodates screw 234. Housing 12 may have a threaded opening that receives screw 234. Screw 234 may be formed from a conductive material such as metal. Using screw 234 and/or metal traces on a structure such as tab 234, layer L2 may be coupled to housing 12. The ability to couple layer L2 to housing 12 in this way helps to reduce noise in the proximity sensor. Layer L2 serves as an internal shield layer whereas layer L1, which faces outwardly from device 10 through antenna window 230, serves to gather capacitance measurements that reflect whether external object 314 is in the vicinity of device 10 and antenna 40.

Slot antenna 40 may be near-field coupled to near-field-coupled antenna feed structure 202. Structure 202 may be formed from metal patch 212. Metal patch 212 may overlap slot 206. Bent leg 214 of metal patch 212 may extend downwards towards ground plane 12. Tip 216 of leg 214 is separated from ground plane 12 by air gap D. Transceiver circuitry 90 is coupled to antenna feed terminals such as terminals 98 and 100 by transmission line 92. Terminal 98 may be connected to tip portion 216 of leg 214 of near-field-coupled antenna feed structure 202. Terminal 100 may be connected to metal housing 12, which forms part of the antenna ground plane for antenna 40.

Near-field-coupled antenna feed structure 202 is near-field coupled to antenna slot 206 of slot antenna 40 by near-field electromagnetic signals and forms an indirect antenna feed for antenna 40. During operation, transceiver circuitry 90 can transmit and receive wireless radio-frequency antenna signals with antenna 40 (i.e., with slot 206) using coupled feed structure 202.

With a slot antenna structure such as slot antenna 40, antenna currents are largest near closed slot end 208 and antenna voltages (and antenna electric field strengths) for antenna signals are lowest near end 208. Antenna currents are minimized near open slot end 218. Antenna voltages (and antenna electric field strengths) are maximized near open slot end 218. To enhance antenna efficiency and antenna bandwidth, it may be desirable to provide slot antenna 40 with a locally widened slot width at end 218 (i.e., at the portion of slot antenna 40 where antenna signal voltages and electric fields are largest). As shown in FIG. 16, for example, a notch such as notch 330 may be formed in metal layers L1 and L2 at end 218 to locally widen slot 206.

The metal traces that form layers L1 and L2 may be formed as metal layers on one or more flexible printed circuits or may be formed on other suitable substrates (e.g., plastic carriers, etc.). As an example, layer L1 may be formed from metal traces on a first side of a flexible printed circuit and layer L2 may be formed from metal traces on an opposing second side of the flexible printed circuit. As another example, layer L1 may be formed from metal traces on the interior surface of antenna window 230 and layer L2 may be formed on a dielectric support such as a flexible printed circuit.

Figure 17:
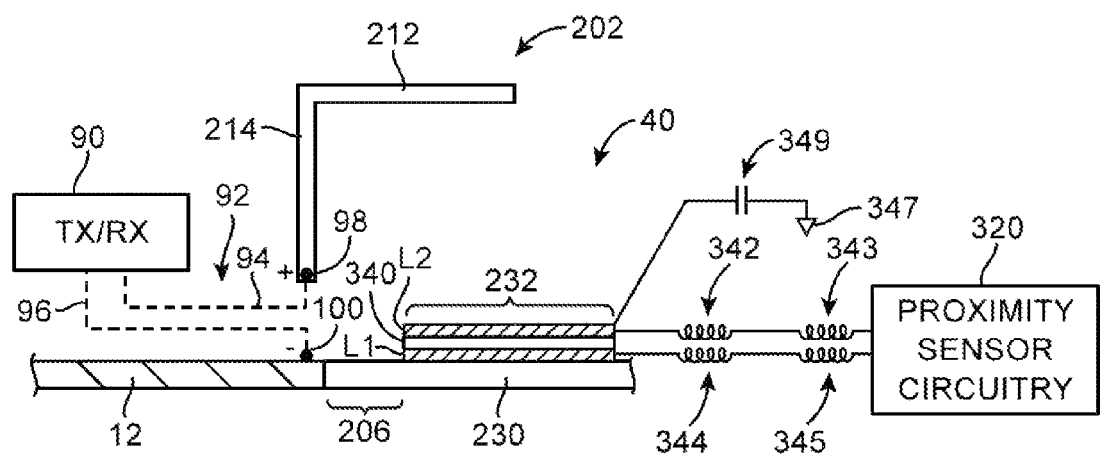
FIG. 17 is a cross-sectional side view of a portion of an electronic device having structures that form an indirectly fed slot antenna and a capacitive proximity sensor in accordance with an embodiment.

A cross-sectional side view of antenna 40 of FIG. 16 taken along line 336 and viewed in direction 338 of FIG. 16 is shown in FIG. 17. As shown in FIG. 17, antenna 40 may include near-field-coupled antenna feed structure 202 having metal patch 212 and leg 214. Antenna slot 206 may be indirectly fed using structure 202. Patch 212 may overlap slot 206. Slot 206 may be a dielectric gap formed between opposing antenna ground structures such as metal housing 12 and conductive structures 232. Conductive structures 232 may be supported by antenna window 230 (e.g., a plastic antenna window) and may include lower metal layer L1 and upper metal layer L2 separated by dielectric layer 340 (e.g., a layer of polyimide or other flexible printed circuit substrate material, etc.).

Layers L1 and L2 serve as capacitive electrodes in a capacitive proximity sensor. Proximity sensor circuitry 320 may be coupled to layers L1 and L2 using inductors 344, 342, 343, and 345. The presence of inductors 344 and 342 prevents high frequency antenna signals from reaching proximity sensor circuitry 320, so that proximity sensor circuitry 320 can make capacitive proximity sensor measurements without interference from antenna operations. Any suitable choke circuitry may be interposed in the paths coupling proximity sensor circuitry 320 to layers L1 and L2. In the example of FIG. 17, inductors 342 and 343 are coupled in series between proximity sensor circuitry 320 and layer L2, whereas inductors 344 and 345 are coupled in series between proximity sensor circuitry 320 and layer L1.

Inductors 342 and 344 may have smaller inductance values (e.g., about 200 nH) to choke high band antenna signals (e.g., signals from 1710-2700 MHz), whereas inductors 343 and 345 may have larger inductance values (e.g., about 300 nH) to chock low band antenna signals (e.g., 700-960 MHz). Additional filter circuitry may be used if desired (e.g., band stop filters including resistors, capacitors, inductors, and/or other circuitry). The example of FIG. 17 is merely illustrative.

Capacitor 349 may be interposed in the path between layer L2 and ground 347 (e.g., housing 12) to couple L2 to ground 347. For example, capacitor 349 may form part of a signal path on tab 234 of FIG. 16 (as an example). Capacitor 349 may have a value of 50 pF or other suitable value. During proximity sensor operations, capacitor 349 forms an open circuit that prevents proximity sensor circuitry 320 from being improperly shorted. During antenna operations, capacitor 349 shorts layers L1 and L2 to ground 347 (i.e., to housing 12), so that layers L1 and L2 serve as part of the antenna ground plane for slot antenna 40. Metal housing 12 on the opposing side of slot 206 serves as the other part of the antenna ground plane. Slot antenna 40 may have feed terminals 98 and 100. Feed terminal 100 may be connected to metal housing 12. Feed terminal 98 may be coupled to leg 214 of structure 202. Transmission line 92 may have path 94 for coupling terminal 98 to transceiver circuitry 90 and may have path 96 for coupling feed terminal 100 to transceiver circuitry 90. Transceiver circuitry 90 may include wireless circuitry such as transceiver 300 and power amplifier 302 of FIG. 15.

Figure 18:
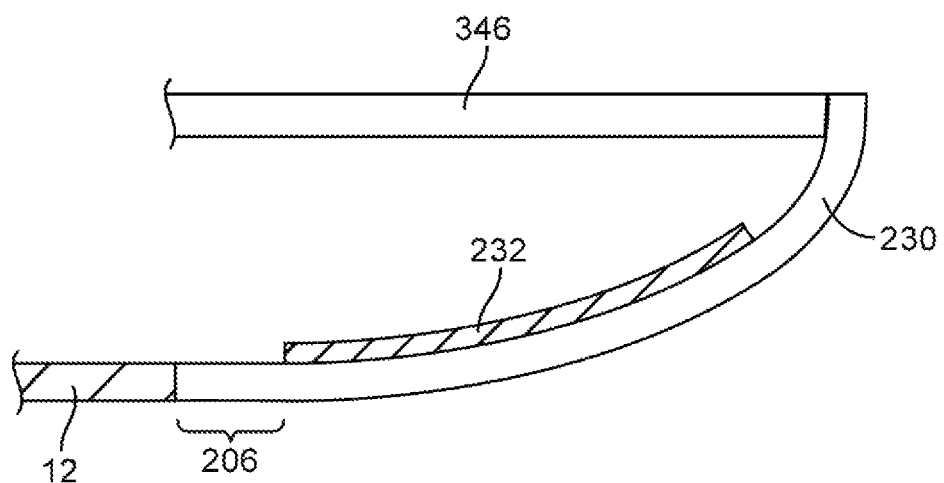
FIG. 18 is a cross-sectional side view of an edge portion of an illustrative electronic device having a slot antenna and capacitive proximity sensor electrode structures in accordance with an embodiment.

FIG. 18 is a cross-sectional side view of an edge portion of device 10 in the vicinity of an illustrative slot antenna. As shown in FIG. 18, slot antenna 40 may be formed from antenna slot 206 between metal housing 12 and conductive structures 232 overlapping antenna window 230. Display 346 may overlap antenna structures 40. Display 346 may include display structures such as a liquid crystal display module or an organic light-emitting display module and/or display cover layer structures such as a clear layer of glass or plastic. Antenna window 230 may have a shape with vertical sidewalls and a horizontal planar rear surface or may have a curved wall shape of the type shown in FIG. 18. Conductive structures 232 may have a curved shape to accommodate the curved surface on the interior of antenna window 230.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
radio-frequency transceiver circuitry that generates radio-frequency signals at a given frequency;
a slot antenna that transmits the radio-frequency signals at the given frequency;
a metal housing;
a dielectric antenna window in the metal housing;
metal structures on the dielectric antenna window that are separated from the metal housing by a slot antenna resonating element in the slot antenna, wherein the metal structures and the metal housing define a shape of the slot antenna resonating element, and the slot antenna comprises a near-field-coupled antenna feed structure that is formed over and near-field coupled to the slot antenna resonating element.

2. The electronic device defined in claim 1 wherein the slot antenna resonating element comprises an indirectly fed slot antenna resonating element.

3. The electronic device defined in claim 2 wherein the near-field-coupled antenna feed structure has a planar metal structure that is near-field coupled to the indirectly fed slot antenna resonating element.

4. The electronic device defined in claim 3 wherein the planar metal structure comprises a patch that overlaps the indirectly fed slot antenna resonating element.

5. The electronic device defined in claim 4 wherein the metal structures comprise capacitive proximity sensor electrode structures.

6. The electronic device defined in claim 5 wherein the capacitive proximity sensor electrode structures comprises a first metal layer and a second metal layer.

7. The electronic device defined in claim 6 wherein the second metal layer is coupled to the metal housing through a capacitor.

8. The electronic device defined in claim 7 further comprising a first inductor coupled to the first metal layer and a second inductor coupled to the second metal layer.

9. The electronic device defined in claim 8 further comprising proximity sensor circuitry coupled to the first and second inductors.

10. The electronic device defined in claim 9 wherein the second metal layer has a protruding portion that is shorted to the metal housing.

11. The electronic device defined in claim 10 wherein the indirectly fed slot antenna resonating element has a closed end formed by the protruding portion and has an open end.

12. The electronic device defined in claim 11 wherein the indirectly fed slot antenna resonating element has a locally widened portion at the open end.

13. The electronic device defined in claim 12 wherein the first and second metal layers have a notch and wherein the locally widened portion is formed by the notch in the first and second metal layers.

14. The electronic device defined in claim 1 wherein the slot antenna is an indirectly fed slot antenna having a near-field-coupled antenna feed structure that is near-field coupled to the slot antenna resonating element of the indirectly fed slot antenna and the radio-frequency transceiver circuitry is coupled to the near-field-coupled antenna feed structure, the electronic device further comprising:
capacitive proximity sensor circuitry coupled to the metal structures.

15. The electronic device defined in claim 14 further comprising inductors coupled between the capacitive proximity sensor circuitry and the metal structures.

16. The electronic device defined in claim 15 wherein the metal structures comprise first and second metal layers, the electronic device further comprising a dielectric layer between the first and second metal layers.

17. An electronic device, comprising:
a dielectric member;
first metal structures overlapping the dielectric member, wherein the first metal structures comprise first and second metal layers;
second metal structures separated from the first metal structures by an antenna slot, wherein the second metal structures comprise a metal electronic device housing and the second metal layer has a protruding portion that extends over the antenna slot and is shorted to the metal electronic device housing during operation of the antenna slot; and
a near-field-coupled antenna feed structure that is near-field coupled to and formed above the antenna slot, wherein the near-field-coupled antenna feed structure and the antenna slot form a slot antenna.

18. The electronic device defined in claim 17 further comprising capacitive proximity sensor circuitry coupled to the first and second metal layers.

19. Apparatus, comprising:
a metal electronic device housing;
a plastic antenna window in the metal electronic device housing;
first and second metal layers overlapping the plastic antenna window, wherein the first and second metal layers are separated from the metal electronic device housing by an antenna slot, the first metal layer is between the second metal layer and the plastic antenna window, the antenna slot has opposing open and closed ends, and the second metal layer is coupled to the metal electronic device housing at the closed end of the antenna slot; and
capacitive proximity sensor circuitry coupled to the first and second metal layers.

20. The apparatus defined in claim 19 further comprising:
a near-field-coupled antenna feed structure that is near-field coupled to the antenna slot, wherein the near-field-coupled antenna feed structure and the antenna slot form a slot antenna.

21. The apparatus defined in claim 20 wherein the near-field-coupled antenna feed structure comprises a metal patch that overlaps the slot.

22. The apparatus defined in claim 21 wherein the antenna slot has opposing open and closed ends, the apparatus further comprising:
a radio-frequency transceiver coupled to the near-field-coupled antenna feed structure, wherein the first and second metal layers have a notch that locally widens the slot at the open end of the slot and wherein the second metal layer is coupled to the metal electronic device housing at the closed end of the slot.

23. An electronic device, comprising:
radio-frequency transceiver circuitry that generates radio-frequency signals at a given frequency;
a slot antenna that transmits the radio-frequency signals at the given frequency;
a metal housing;
a plastic antenna window in the housing; and
metal structures on a surface of the plastic antenna window that are separated from the metal housing by a slot antenna resonating element in the slot antenna, wherein portions of the metal structures on the plastic antenna window and portions of the metal housing define a shape of the slot antenna resonating element in the slot antenna, the slot antenna resonating element has opposing open and closed ends, and the metal structures are coupled to the metal housing at the closed end of the antenna slot resonating element.

24. The electronic device defined in claim 23 wherein the slot antenna comprises an indirectly fed slot antenna.

25. The electronic device defined in claim 24 wherein the slot antenna comprises a first indirectly fed slot antenna and wherein the electronic device further comprises a second indirectly fed slot antenna formed from portions of the metal structures on the plastic antenna window and portions of the metal housing.

26. The electronic device defined in claim 25 wherein the first and second indirectly fed slot antennas have open ends that face each other.

\* \* \* \* \*